Jan. 3, 1950 C. L. THORNE 2,493,044
DEFLECTION WAVE GENERATOR
Filed June 22, 1946
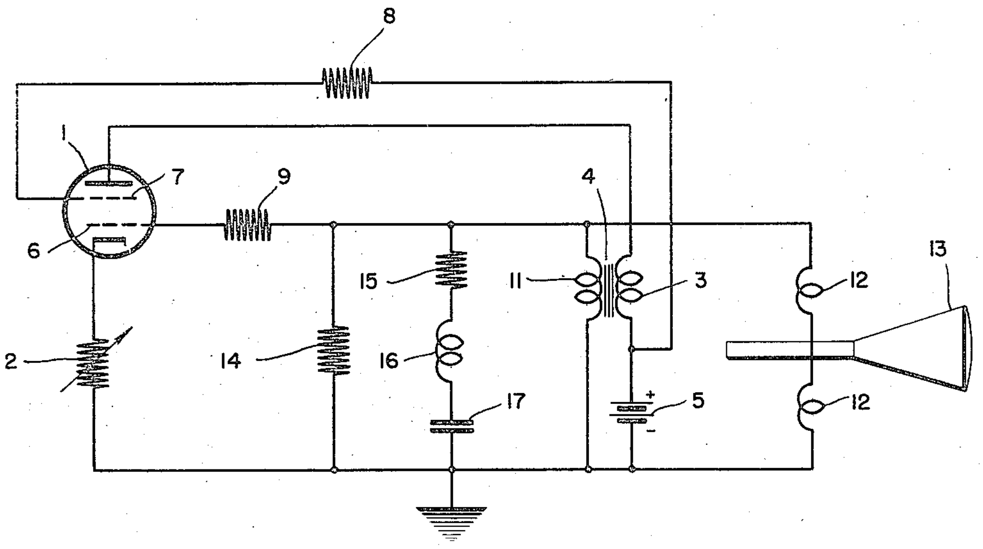
INVENTOR
CHARLES L. THORNE
BY [signature]
ATTORNEY Patented Jan. 3, 1950 2,493,044

UNITED STATES PATENT OFFICE 2,493,044

DEFLECTION WAVE GENERATOR

Charles L. Thorne, Fort Wayne, Ind., assignor, by mesne assignments, to Farnsworth Research Corporation, a corporation of Indiana Application June 22, 1946, Serial No. 678,579

4 Claims. (Cl. 250—36)

This invention relates to saw-tooth wave generators and particularly to relaxation oscillators capable of producing saw-tooth current waves for use in conjunction with electromagnetic deflection systems for cathode ray tubes.

According to conventional practice, one type of cathode ray tube which is used in oscilloscopes, television systems and the like, employs an electromagnetic deflection system for systematically directing an electron beam over a target electrode. In this type of deflection system there is required for its energization a current having a substantially saw-tooth wave form, whereby to produce a beam deflection field of substantially saw-tooth form. Numerous self-oscillating relaxation wave generators for producing such a saw-tooth current wave have been devised. One of these generators forms the subject matter of a corresponding application of Madison Cawein, bearing Serial Number 471,977, filed January 11, 1943, entitled Wave generator and since matured into Patent No. 2,440,895. The Cawein oscillator includes a beam power tube or its equivalent which is provided with an inductive regenerative coupling between the anode and the control grid circuits. The anode-to-cathode circuit of this device includes a resistive component comprising a resistor connected to the cathode, the internal resistance of the tube and whatever resistance is reflected into this circuit from the inductive coupling device. The Cawein oscillator is of the L/R type, wherein the oscillation frequency is a function of the ratio of the anode-to-cathode inductance to the total effective dynamic resistance of the anode-to-cathode circuit.

The use of the Cawein oscillator has enabled the production of a saw-tooth current wave of sufficient magnitude to energize a cathode ray tube electromagnetic deflection system for operation in a television system conforming to the present day standards. It has been most effectively used in the horizontal deflection system of a television tube wherein the frequency of the wave is required, according to present standards, to be 15,750 cycles per second. Nevertheless, in order to meet the rigorous requirements of a scanning oscillator for such use, the Cawein device had to be operated close to the limit of its capacity and the circuit design, therefore, in order to achieve this maximum output, is quite critical.

The subject matter of the present invention consists of an improvement upon the Cawein oscillation generator, whereby to enable the production of a greater usable output. In order to fully understand the nature of this improvement, a thorough comprehension of the fundamental characteristics of an L/R oscillator of the Cawein type is necessary.

At the start of the trace interval of a scanning cycle, current begins to flow through the tube and also through the anode-connected coupling element. By reason of the regenerative coupling between the anode and the control grid elements of the tube, there is impressed upon the control grid a high positive potential whereby to minimize the impedance of the tube. The anode current increases in an exponential curve for the reason that it is required to flow in a circuit which includes a series inductance device. As in all exponential curves, only a relatively small portion at the beginning thereof is substantially linear. Consequently, for a relaxation oscillator of the Cawein type, the current rise must be restricted to the relatively linear portion of the characteristic curve. At such a point, it is characteristic of the Cawein oscillator for a current relaxation to begin. Once started, this relaxation is substantially instantaneous. This may be appreciated when it is considered that the sense of the current change in the anode connected inductance device produces a high negative potential for impression upon the control grid. Thus, the impedance of the tube is raised substantially instantaneously to what in effect is an infinite value, thereby completely and very abruptly interrupting the flow of current through the tube and consequently through to the external anode-to-cathode circuit. As soon as the current interruption is complete, the voltages impressed upon the various tube electrodes, including the control grid, revert to their initial values and polarities, whereby another cycle of operation is initiated.

By reason of the fact that the current changes produced in the oscillator circuits are abrupt, there is produced in the inductive circuits of the device a transient current oscillation during each cycle of oscillation. These current oscillations are most pronounced at the beginning of each trace interval and therefore render this portion of the current wave unusable to energize the deflection system of a cathode ray tube. For this reason the usable linear portion of the current wave is of shorter duration than it would be if the oscillation were not present.

Therefore, it is an object of the present invention to provide a relaxation oscillation generator capable of producing a saw-tooth current wave suitable for use to energize a cathode ray deflection system over a greater range than that which can be covered by the use of the current waves capable of being produced by prior art devices of this character.

Another object of the invention is to provide a relaxation oscillator of the L/R type for producing a saw-tooth current wave wherein transient oscillations are minimized.

In accordance with the present invention, there is provided an L/R relaxation oscillation generator for developing a saw-tooth current wave which employs a vacuum tube having input and output circuits. The input and output circuits of the tube are inductively coupled in a regenerative manner whereby to develop a substantially linear saw-tooth current wave having a relatively long trace interval and a relatively short retrace interval during each cycle. The respective slopes of the trace and retrace portions of the saw-tooth current wave are dependent upon the ratio of the inductance to the resistance of the output circuit effective during the respective trace and retrace intervals of each cycle. In addition, according to the present invention, there is provided a means coupled to the input circuit of the tube for damping transient oscillations of the current wave whereby to extend the usable range of the linear portion of the wave.

More specifically, in accordance with the illustrated embodiment of the invention, the oscillation damping means consists of an impedance device connected in parallel with the input circuit of the tube. The impedance device may, if desired, be incorporated with a reactive circuit tuned to a predetermined frequency corresponding to some of the harmonics of the oscillation frequency.

For a better understanding of the invention together with other and further objects thereof, reference is made to the following description, taken in connection with the accompanying drawing, and its scope will be pointed out in the appended claims.

In the accompanying drawing, the single figure is a schematic diagram of one form of apparatus embodying the instant invention.

Referring now to the drawing, the relaxation oscillator includes a vacuum tube 1, which in the present instance, is a beam power tube, such as an RCA type 6L6. The cathode of this tube is connected through an adjustable resistor 2 to ground. The anode of the tube is connected through the primary winding 3 of coupling transformer 4 to the positive terminal of a source of direct current, such as a battery 5, the negative terminal of which is connected to ground. In a specific case, the battery may be from 300 volts to 350 volts. In addition to the cathode and anode, the tube 1 is provided with a control grid 6, and a screen grid 7. The screen grid 7 is connected to the positive terminal of the battery 5 through a voltage dropping resistor 8 which may have a value of 6000 ohms. The control grid is connected through a current limiting resistor 9 having a value of approximately 5600 ohms to one terminal of a secondary winding 11 of the coupling transformer, the other terminal of which is connected to ground.

The output of the oscillator is derived from the control grid circuit. Accordingly, the deflection coils 12 of a diagrammatically illustrated cathode ray tube 13, are connected between ground and the grid-connected terminal of the transformer primary winding 11. The apparatus described up to this point is essentially a relaxation oscillator of the Cawein type referred to, which is capable of producing a substantially saw-tooth current wave for impression upon the cathode ray tube deflection coils 12.

In accordance with a feature of the present invention, an oscillation damping resistor 14 having a value of the order of 1500 ohms is connected in parallel with the secondary transformer winding 11. In addition, if desired, the damping impedance may be included in a reactive circuit coupled to the control grid 6 of the tube. This circuit may comprise, for example, a series arrangement of a resistor 15 of approximately 3300 ohms, an inductance device such as a coil 16 having an inductance of the order of 10 millihenries and a condenser 17 of about 0.001 microfarad connected in parallel with the secondary transformer winding 11.

Considering now the operation of the apparatus embodying the invention, reference will be made first to the operation of the relaxation oscillator omitting, for the present, consideration of the operation of the oscillation damping facilities. At the beginning of a trace interval of a scanning cycle, current flows in an anode circuit of the oscillator tube 1. This current traverses the primary winding 3 of the coupling transformer and also the cathode-connected resistor 2. The anode circuit thus is seen to comprise a series connection of an inductive component and a resistance element. The resistance element of this circuit includes not only the resistor 2, but also the internal resistance of the tube 1, and the resistance of the primary winding 3. By reason of the inclusion in this circuit of the inductive primary winding, the current increases in magnitude in the anode circuit according to an exponential function in a well-known manner. The primary and secondary windings 3 and 11 respectively, of the coupling transformer are so polarized with respect to one another that an increase in the magnitude of the current flowing in the primary winding induces in the secondary winding a positive voltage for impression upon the control grid 6. The ratio of turns of these two windings is such that the magnitude of this positive voltage is sufficient to effect a current flow in the control grid circuit. The magnitude of this current flow may be limited as desired by a suitable choice of the value of the resistor 9.

Current continues to flow in the anode circuit of the tube 1, increasing substantially at a linear rate until a point is reached at which a relaxation occurs. The precise reason for the initiation of a current relaxation is not known at present. However, it is believed that at a particular point in the trace interval of each scanning cycle a slight change in the potential of one or more of the tube electrodes occurs. Any such change would be magnified many times by the feed-back circuit with which the oscillator is provided. In any case, as soon as the current in the anode circuit of the tube begins to decrease in magnitude, there is developed in the secondary winding 11 of the coupling transformer a negative impulsive voltage of a considerable magnitude which is impressed upon the control grid 6. In this manner the internal impedance of the tube 1 is increased to virtually an infinite magnitude. Thus, it is seen that during the trace interval of the cycle the dynamic resistance of the anode circuit is relatively low in magnitude and that during retrace intervals the magnitude of this resistance is relatively high. It can be considered therefore, that the saw-tooth current wave which is generated results from an alternate shifting or oscillation in magnitude of the dynamic resistance of the anode circuit between two widely differing values.

The free running oscillation frequency of the device may be determined within reasonable limits by appropriate adjustment of the cathode resistor 2. In this manner the L/R ratio of the device is changed and thereby, by reason of the inherent characteristic of such an oscillator, a corresponding change in the oscillation frequency thereof is effected. Also an adjustment of the control grid-connected resistor 9 is effective to adjust the oscillation frequency of the device.

The current which flows in the anode circuit of the oscillator tube 1 must traverse an inductive element such as the primary winding 3 of the coupling transformer. During retrace intervals, the current in this circuit changes very abruptly from a maximum to a minimum value. After the current has been reduced to zero in this abrupt manner, there are developed in the secondary winding 11 of the coupling transformer oscillations which ordinarily persist for a sufficient time to be superimposed upon the current wave produced by the initiation of the trace interval of the succeeding scanning cycle. The resultant current wave is not suitable for use to energize the deflection coils 12. Consequently, heretofore it has been necessary to blank the cathode ray tube 13 for a long enough time to permit the oscillations to subside before beginning a new scanning cycle.

In accordance with the present invention, the shunt resistor 14 provides a parasitic circuit wherein the oscillations which occur in the secondary winding 11 of the coupling transformer may be dissipated. It has been found that the time during which such oscillations persist is substantially less than that required for the decay of these transient effects in an oscillator not provided with additional damping facilities.

Furthermore, it has been found that, by tuning the damping circuit to one or more hormonics of the transient oscillation frequencies, the time required to dissipate these oscillations may be further reduced. Such a tuned damping circuit is provided by the series connection of the resistor 15, the coil 16, and the condenser 17. In particular it has been found that by a combination of damping circuits such as the shunt resistor 14 and the tuned series circuit such as the resistor 15, the coil 16, and the condenser 17, the efficiency of the device may be raised by approximately 10 per cent. Accordingly, the limiting values of the deflection currents produced by apparatus of this character cover a considerably wider range than heretofore has been possible of attainment. Thus greater deflection control of the electron beam may be achieved and the angle through which the beam may be deflected is increased by approximately 10 per cent. Such an accomplishment is particularly useful in present day television receivers where high velocity beams are employed and where, in many cases, it is desired to deflect the beam over a large size tube screen.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A relaxation oscillation generator for developing a saw-tooth current wave comprising, a vacuum tube having input and output circuits, means for regeneratively coupling said output and input circuits whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said output circuit effective during the respective trace and retrace intervals of each cycle, and an oscillation damping resonant network coupled in parallel with said input circuit for reducing transient oscillations in said current wave.

2. A relaxation oscillation generator for developing a saw-tooth current wave comprising, a vacuum tube having input and output circuits, means for regeneratively coupling said output and input circuits whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said output circuit effective during the respective trace and retrace intervals of each cycle, and an oscillation damping resonant circuit including a resistor and a series connection of an inductor and a condenser coupled in parallel with said input circuit for reducing transient oscillations of said current wave.

3. A relaxation oscillation generator for developing a saw-tooth current wave comprising, a vacuum tube having input and output circuits, means for regeneratively coupling said output and input circuits whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said output circuit effective during the respective trace and retrace intervals of each cycle, and an oscillation damping network including a resistor, an inductor and a condenser connected in series across said input circuit for reducing transient oscillations of said current wave.

4. A relaxation oscillation generator for developing a saw-tooth current wave comprising, a vacuum tube having input and output circuits, means for regeneratively coupling said output and input circuits whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said output circuit effective during the respective trace and retrace intervals of each cycle, and an oscillation damping network connected in parallel to said input circuit for reducing transient oscillations of said current wave, said network comprising two parallel branches, one of said branches including a resistor and the other of said branches including a series arrangement of an inductor and a condenser.

CHARLES L. THORNE.

(References on following page)

REFERENCES CITED

The following references are of record in the file of this patent:

UNITED STATES PATENTS

| Number | Name | Date |
|---|---|---|
| 2,115,877 | Rocard | May 3, 1938 |
| 2,140,004 | Falloon | Dec. 13, 1938 |
| 2,227,075 | Geiger | Dec. 31, 1940 |
| 2,360,697 | Lyman | Oct. 17, 1944 |
| 2,373,165 | Cawein | Apr. 10, 1945 |
| 2,396,476 | Schade | Mar. 12, 1946 |

FOREIGN PATENTS

| Number | Country | Date |
|---|---|---|
| 493,142 | Great Britain | Oct. 5, 1938 |
| 806,561 | France | Sept. 28, 1936 |

OTHER REFERENCES

Terman: "Radio Engineering," 1937, page 365.